United States Patent Office 3,499,086
Patented Mar. 3, 1970

3,499,086
METHODS AND COMPOSITIONS FOR CONTROLLING FUNGAL AND BACTERIAL INFESTATION OF PLANTS UTILIZING ORGANIC TETRAVALENT TIN COMPOUNDS
Hans Brueckner and Kurt Haertel, Burgkirchen an der Alz, Germany, assignors to Farbwerke Hoechst Aktiengesellschaft vormals Meister Lucius & Bruning, Frankfurt am Main, Germany, a company of Germany
No Drawing. Continuation-in-part of application Ser. No. 440,868, July 1, 1954. This application Jan. 10, 1956, Ser. No. 558,185
Claims priority, application Germany, July 3, 1953, A 18,340
Int. Cl. A01n 9/00, 21/00
U.S. Cl. 424—286                                     18 Claims

ABSTRACT OF THE DISCLOSURE

A process for controlling fungus and bacteria infestation of plants by applying thereto a composition consisting essentially of an emultifying agent and an organic tetravalent tin compound of the fomula:

in which $R_1$, $R_2$ and $R_3$ are lower alkyl, phenyl, benzyl or naphthyl and $R_4$ is lower alkyl, phenyl, benzyl, naphthyl chloro, lower saturated aliphatic carbonyloxy, benzoyloxy, anthranyloxy, salicycloxy, phenoxy, phenylmercapto or chlorophenoxy.

---

This invention relates to compositions suitable for application on plants and seeds. More particularly, the compositions of the present invention are useful for combating fungus and bacteria infections in plants and seeds and have insecticidal, herbicidal, algicidal, and plant growth regulating properties. Certain of the active compounds of the compositions of the present invention have exceedingly active properties and are believed to be new compounds. This application is a continuation-in-part application of our copending application, S.N. 440,868, filed July 1, 1954.

In accordance with the present invention, fungus and bacteria infections in plants and seeds may be treated by use of the compositions wherein the active component is an organic compound of tetravalent tin of the general formula:

wherein $R_1$, $R_2$, $R_3$ and $R_4$ represent the same or different alkyl, aryl, aralkyl, haloalkyl and cyclo aliphatic radicals, any of which may be replaced up to a maximum of 3 by halogens, aliphatic and aromatic mono- and dicarboxylic acid radicals, radicals of mono- and polyvalent alcohols, ether alcohols, phenols and thiophenols, or halogen and nitro derivatives thereof. It has been found that compounds in which at least two of the four R-positions in the formula are filled in by the normal or secondary butyl radicals are especially recommendable for such purposes.

The following compounds are mentioned by way of example: tetra-ethyl-stannane, tetra-n-propyl-stannane, tetra-n-butyl-stannane, tetra-sec.-butyl-stannane, tetra-n-hexyl-stannane, tetra-n-dodecyl-stannane, tetra-benzyl-stannane, tri-n-butyl-monochloro-stannane, tri-phenyl-monochloro-stannane, tri-phenyl-monoacetato-stannane, tri-n-butyl-monothiophenolato-stannane, tri-n-butyl-pentachlorophenolato-stannane, tri-n-butyl-mercaptobenzothiazolato-stannane, di-n-butyl-dipentachlorophenolato-stannane, di-ethyl-dibromo-stannane, di-n-butyl-di-chloro-stannane, di-n-butyl-dimethoxy-stannane, di-n-butyl-di-chloroacetato-stannane, di-n-propyl-di-paranitrophenolato-stannane, di-n-butyl-di-benzoato-stannane, di-phenyl-dichloro-stannane, di-n-butyl-di-diethyldithiocarbaminato-stannane, mono-butyl-trichloro-stannane, and mono-butyl-tribromo-stannane.

It has been found that the above compounds possess unexpected and unobvious outstanding fungicidal and bactericidal properties with a very broad effective scope, and, when combined with a suitable carrier, are outstandingly suitable for combating fungus and bacteria infections such as caused by Peronospora, Phythophthora, Fusicladium, Botrytis, Septoria and the like. They are also very effective against Helminthosporium, Fusarium and Tilletia so that they may also be employed as seed dressing agents and as disinfectants for various grains.

The most important use, however, lies in the application of the above compounds on the living plants of all kinds, e.g. potatoes, celery plants, sugar beets, wheat, rye, fruit trees, etc. In these cases care must be taken to choose compounds which, while displaying satisfactory fungicidal and bactericidal properties, do not kill the plant itself by "burning" the leaves or stems. For this purpose are recommended stannanes in which $R_1$, $R_2$, $R_3$ are phenyl, naphthyl or hexyl groups, whereas $R_4$ is a formiate, acetate, propionate or butyrate group. It has been found that these compounds not only do not impair the living plants but on the contrary are acting as a systemic stimulant for the growth of plants, bringing about considerable increases in harvest outputs. Thus one of the objects of the present invention is the application of said compounds to living plants which are perfectly free from any fungicidal or other infectious diseases in order to promote the plant growth and the formation of their fruit.

Other organic tin compounds recommended for the treatment of living plants comprise individuals in which one or more radicals of aliphatic hydroxy carboxylic acids or amino carboxylic acids are attached to the central tin atom, e.g. tri-isopropyl-lactato-stannane, tributyl-lactato-stannane, tri-isopropyl-salicylato-stannane, dibutyl-disalicylato-stannane, triphenyl-lactato-stannane, diphenyl-dilactato-stannane, and the corresponding compounds with anthranilic acid and with aminobenzoic acid.

The tetravalent tin compounds, generally described above, may be prepared by known methods. The compounds containing 4 hydrocarbon radicals are prepared according to the method of L. W. Jones (Journ. Chem. Soc. London 1935, pages 39–47). From these compounds halogenated compounds are prepared according to the method of K. A. Kozeschkow (berichte der Deutchen Chem. Gesellschaft, volume 62 (1929), page 996; volume 66 (1933), page (1669)). The said halogenated compounds may be reacted with the sodium salts of phenols, thiophenols, mono- and dicarboxylic acids etc. according to Annalen volume 114, page 366 as well as U.S. specification 2,560,034.

In addition to the fungicidal and bactericidal properties, compositions containing organic compounds of tetravalent tin of the aforesaid type have been found to be effective as insecticidal, herbicidal and algicidal agents. Furthermore, these latter properties as well as fungicidal and bactericidal properties are considerably enhanced when at least one valence of the tetravalent tin is satisfied by an organic radical known to be responsible in other compositions for fungicidal, bactericidal, insecticidal, herbicidal and/or algicidal activity.

As examples for such radicals are mentioned the radicals of (fungicidal) diethyl-dithiocarbamatic acid, ethylene - bis - dithiocarbamatic acid, mercaptobenzothiazol, maleic acid naphthylamide; (herbicidal) 2,4 - dichloro-phenoxy-acetic acid, 2,4,5-trichloro-phenoxy-acetic acid; (bactericidal) p-toluene sulfamide; (algicidal) pentachlorophenolate, trichloromethyl - mercaptane; (insecticidal) dialkyl-phosphoric acid, dialkyl-thiophosphoric acid. The resulting tetravalent tin compounds including such radicals are believed to be new and, as shown by examples appearing hereinafter, have exceedingly high activities. Examples of such compounds include:

Di-n-butyl-bis-(diethyl-dithiocarbaminato)-stannane,
Ethylene-bis-dithiocarbaminato-bis-(triphenyl)-stannane,
Tri-n-butyl-mono-pentachlorophenolato-stannane,
Tri-n-butyl-(2,4,6-trichlor-phenoxy-aceto)-stannane,
Di-n-propyl-di-mercaptobenzothiazolato-stannane,
Tri-n-butyl-(trichloromethyl-mercapto-di-carbathoxy)-methyl-stannane,
Tri-n-butyl-(p-toluol-sulfamido)-stannane.

In addition to possessing fungicidal, bactericidal, insecticidal, herbicidal and algicidal properties, the organic compounds of tetravalent tin represented by the above general formula possess the property of affecting the growth of plants. Thus, in relatively low concentrations, they promote and stimulate plant growth. On the other hand, in relatively higher concentrations, they will in fact destroy the plant life. Although all such compounds are effective in growth promotion, it has been found that a certain preferred group of such compounds have particularly enhanced growth regulating effects. These compounds, each of which is believed new, include organic compounds of tetravalent tin of the above general formula having at least one substituent which is a radical known in other compounds to be effective as a plant growth regulating agent. Examples of such radicals include mercaptobenzothiozol-, diethyldithiocarbamic acid-, halogenated phenoxy acetic acid-, indolyl- and naphthoxy fatty acid-, trichloromercaptyl- and other radicals. Specific examples appearing hereinafter well illustrate these preferred organic tetravalent tin compounds.

Insofar as the growth-regulating properties of the compounds of the present invention are concerned, when an active compound is supplied in amounts of from 0.3 to 3.0 kg. per hectare (1 acre=0.4046873 hectare), preferably 0.5 to 2.0 kg. per hectare, it stimulates the growth of plants as will be shown by specific examples appearing hereinafter. Instead of treating young and old plant cultures by applying the material on the ground or plants per se, it is of course possible to dress the seeds by applying, depending on the type of seed and the specific active material selected, from 10 to 50 g. of active material per 100 kg. of seed.

When applying larger quantities of the aforesaid preferred plant growth-regulating materials, e.g., from 5 to 30 kg. per hectare, these tetravalent tin compounds damage the intergrowth structure of the plant to such an extent that they become malformed on further growth and eventually die off. Thus, these compounds are further useful for the control of weed growth.

According to the present invention, these compounds may be associated with a carrier in the solid state, such carriers preferably being inert substances such as siliceous limestone, finely ground fire clay, kaolin, talc, calcium carbonate, sulfite liquor wastes, methyl cellulose and the like. The compositions formed with the tin compound and the solid carriers are generally ground into a powder to be dusted while wetted with water onto the treated plant matter. The tin compounds may also be disposed in a solvent or dispensed in liquid diluents such as methanol, ethanol and the like. Again, the tin compounds may be emulsified with ionic and non-ionic substances such as fatty alcohol, sulfonates, alkyl phenols and the like.

Thus for instance the stannanes of Examples XII, XIII, XVIII may be used either in form of a powder ground together with a solid carrier such as talc, kaolin and the like and suspended in water, or in the form of an emulsion in a liquid such as benzene or acetone in the presence of an emulgator such as alkylaryl sulfonates or in the form of a solution in a solvent. In each case the concentration of the organic tin compound may be about 15, 20 or 25 percent. They may also be employed in combination with other fungicidal, bactericidal and/or insecticidal substances as dusting, spraying or fogging agents.

The percentage of active ingredient in the compositions may be varied. It is, however, necessary that the active ingredient constitute a proportion such that an effective dosage will be obtained. The active ingredient is preferably used in a percentage of at least 0.005% of the weight of the matter to be treated. Activity increases with increased concentration of the agent.

The following examples are for the purpose of illustration only and are not limiting to the scope of the present invention which is set forth in the claims:

EXAMPLE I

Two hundred and fifty grams of a disinfecting agent containing 20% by weight of tetrabutyl stannane and 80 parts by weight of talc were mixed with 100 kg. of rye seeds which had been strongly infected with *Fusarium nivale*. It was found that the Fusarium infection in the resultant grain was suppressed to between 2 and 3%. On the other hand, untreated rye seeds, used as a control, produced grain that was infected up to about 56%.

EXAMPLE II

A powder having a treatment concentration of from about 0.5% to 1% which consisted of 20% by weight of dibutyl-dichloro-stannane, 60% by weight of kaolin and 20% by weight of the tarry waste products of a sulfite liquor, was sprayed on celery plants of the type available on the market. It was found that the germination of the spores of *Septoria apid* was completely prevented and there was no resultant infection, whereas untreated and infected plants showed a strong attack by the *Septoria apii* fungus.

EXAMPLE III

The spores of *Botrytis cinerea* were placed in a nutrient solution containing only 0.005% of suspended dibutyl diacetyl stannane. None of the spores germinated. On the other hand, untreated Botrytis spores, used as a control, were found to germinate up to 90% within 24 hours.

EXAMPLE IV

A powder having a treatment concentration of 1% consisting of 20% by weight of diphenyl dichlorostanne, 60% by weight of precipitated calcium carbonate and 20% by weight of sulfite liquor wastes, was sprayed on potato plants infected with *Phytophthora infestans*. No Phytophthora infection resulted. On the other hand, simultaneously infected potato plants which were not treated with the powder showed evidence of infection within 10 days.

EXAMPLE V

Spores of *Sclerotinia fructicola* were placed in a nutrient solution containing 0.01% of dimethoxy dibutyl stannane. It was found that the germination of the spores was completely prevented. Untreated spores, used as a control, were found to germinate 100% within six hours.

EXAMPLE VI

The spores of *Macrosporium sarciniforme* were placed in a nutrient solution to which only 0.01% of diethyl dibromo stannane was added. The germination of the spores was found to be completely prevented. Untreated spores, used as a control, were found to germinate up to 90% in a 24 hour period.

EXAMPLE VII

Two hundred grams of a seed powder consisting of 7.5% by weight of tri-butyl-acetato-stannane, 0.5% by weight of white oil and 92.0% by weight of talc are thoroughly mixed with 100 kg. of wheat seed which was infected by spores of *Telletia tritici*. The latter mixture is then sown as usual on a field. At harvest time the wheat culture so prepared is entirely free from *Tilletia tritici*, whereas a wheat culture from the same wheat seeds infected with *Tilletia tritici* but not mixed with the above mentioned seed powder showed 47.0% of wheat steams ill with *Tilletia tritici*.

EXAMPLE VIII

A solution is prepared from 10.0% by weight of mono-butyl-trichloro-stannane, 50.0% by weight of ordourless petrolatum, 5.0% ethylene chloride, 5.0% by weight of a resin of the alkyd type and 30.0% by weight of butyl glycol. A piece of dry pine wood was impregnated with this solution, dried and inoculated with *Poria contigua* on a nutrient substratum from malt extract and gelatine. The pine wood so treated was still after a period of 6 months entirely free from fungi, whereas an unimpregnated piece of pine wood inoculated with the same nutrient solution of *Poria contigua* was in the same time totally destroyed by fungi.

EXAMPLE IX 100 cubic cms. of emulsified tri-n-butyl-mono-aceto-stannane was added to a water reservoir of approximately 1000 litres containing a heavy growth of algae. In the course of 14 days all algae had died. The water remained free of algae after treatment.

EXAMPLE X

In a water reservoir of approximately 100 litres, a syringe was cleaned containing residual emulsified tri-butyl (2,4,6-trichlorophenoxyaceto) stannane. Within 3 weeks all algae died and the reservoir remained free of algae.

EXAMPLE XI

Healthy planting potatoes of the type "Bona" were sprayed with a 0.5% emulsion containing 50.0 parts of di-n-butyl-diaceto-stannane. A copper oxychloride preparation containing 50% pure Cu at an application concentration of 0.5% was used as a means of comparison. Each application took place at intervals of approximately 4–6 weeks making a total of four times during the period of vegetation. The stock of plants was free from Phytophthora and other plant insects. The resulting yields were as follows:

| Treating agent | Concentration, percent | Average increased yield of potatoes, percent |
|---|---|---|
| Di-n-butyl-diaceto-stannane | 0.5 | 32.5 |
| Copper Oxychloride | 0.5 | 13.7 |
| Not treated | | ±0 |

The potato plants treated with di-n-butyl-diaceto-stannane showed weak, but distinctly recognizable changes of leaves in such a way that the leaflets were more numerous and stood essentially more crowded than the ones not treated or treated with copper oxychloride.

EXAMPLE XII

Celery plants which were infected with *Septoria apii* were sprayed in the concentration of 0.5% with a suspension containing 20.0% tri-phenyl-mono-aceto-stannane. The application took place four times at intervals of approximately six weeks during the period of vegetation. As a comparison, one equally large number of celery plants were similarly treated with a copper preparation and another with a mercury compound. The celery plants treated with tri-phenyl-mono-aceto-stannane showed, during the entire time of vegetation, a richer, sparkling green color of leaves and faster growth than the other treated plants. The results of these tests were as follows:

| Treating Agents | Concentration (percent) | Average weight of each celery plant (g.) | Average weight of the leaves of each plant (g.) | Percent infection of the leaves by *Septoria apii* |
|---|---|---|---|---|
| Triphenyl-monoaceto-stannane | 0.5 | 662 | 309 | 0.75 |
| Copper Oxychloride | 0.5 | 382 | 135 | 18.90 |
| Phenyl-Hg-Acetate | 0.5 | 363 | 142 | 19.65 |
| Untreated | | 285 | 128 | 75.2 |

EXAMPLE XIII

Sugar beets were treated in a concentration of 0.3% with a suspended in water preparation containing 20 parts of dibutyl-bis-(ethylenebisdithiocarbamato)-stannane. As a comparison, the same number of beet plants was sprayed with a copper preparation (50% pure Cu) in the concentration of 0.5% and also the same number of beet plants was left untreated. The application took place at intervals of approximately six weeks during the period of vegetation. The harvest result, on the average, was as follows:

| Treating Agents | Concentration, Percent | Increased Yield Beets, Percent | Increased Yield No. of Leaves, Percent | Percent of Plants infected with *Cercospora beticola* |
|---|---|---|---|---|
| Dibutyl-bis-(ethylene-bisdithiocarbamato)-stannane | 0.3 | 32.5 | 26.3 | 17.0 |
| Copper Oxychloride | 0.5 | 18.2 | 14.6 | 38.0 |
| Untreated | | ±0 | ±0 | 97.0 |

EXAMPLE XIV

Rye considerably infected with *Fusarium nivale* was disinfected by applying a quantity of 200 g. upon 100 kg. of rye with a powder containing 10.0% of tri-n-propyl-pentachlorphenolato-stannane. A known mercury disinfectant (phenyl-Hg-acetate) was used as a means of comparison.

It was shown that the rye seeds disinfected with tri-n-propyl-pentachlorphenolato-stannane broke through the earth three days earlier than the ones disinfected with the mercury disinfectant. The "Fusarium" infection amounted to only 2.5% in the rye treated with tri-n-propyl-pentachlorphenolato-stannane. The rye treated with the mercury disinfectant showed a 5.4% infection. The infection in the untreated rye amounted to 87.5%.

After three weeks, the lengths of the rye sprouts were also measured. With rye treated with tri-n-propyl-pentachlorophenolato-stannane, the sprouts were 30.4% longer than the ones treated with the mercury compound.

EXAMPLE XV

An emulsified concentrate containing 25.0% tri-phenyl-(trichlormethylmercapto-di-carbathoxy) - methyl - stannane was applied in the concentration of 0.25% for the destruction of Fusicladium of apples of the type "Geheimrat Oldenburg." A known organic fungicide in the concentration of 0.3% served as a means of comparison.

The harvest yield was as follows:

| Treating Agents | Percent Infection Free | Percent Minor Infection | Percent Badly Infected |
|---|---|---|---|
| Tri-phenyl-(trichlormethylmercapto-di-carbathoxy)-methyl-stannane | 100 | 0 | 0 |
| Zinc-ethylene-bis-diothiocarbamate | 95.8 | 4.2 | 0 |
| Untreated | 2.0 | 29.0 | 69.0 |

EXAMPLE XVI

Wheat which was considerably infected with spores of *Tilletia tritici* was disinfected with a powder containing 8.0% tri-ethyl-(p-toluol-sulfamido)-stannane at a rate of 200 g. per each 100 kg. of wheat. A mercury disinfectant served as a means of comparison.

The following summarizes the average field test results for three different batches:

| Treating Agents | Infection in Percent | | |
|---|---|---|---|
| | a | b | c |
| Tri-ethyl-(p-toluol-sulfamido)-stannane | 0 | 0.3 | 0.2 |
| Phenyl-Hg-acetate | 0.2 | 0.8 | 0.9 |
| Untreated | 57.3 | 59.6 | 64.7 |

EXAMPLE XVII

Healthy planting potatoes of the type "Bona" were sprayed in the concentration of 0.5% with an emulsified concentrate containing 50.0 parts of dibutyl-diaceto-stannane. A copper oxychloride preparation containing 50% pure Cu at the usual application concentration of 0.5% served as a means of comparison. Each application took place at intervals of approximately 4 to 6 weeks, making a total of four times during the period of vegetation. The stock of plants was kept fre from Phytophthora and other plant insects.

Yield results were as follows:

| Treating Agents | Concentration, Percent | Average Increase Yield of Potatoes, Percent |
|---|---|---|
| Dibutyl-diaceto-stannane | 0.5 | 21.3 |
| Copper oxychloride | 0.5 | 7.5 |
| Untreated | | ±0 |

EXAMPLE XVIII

Celery plants of the variety "Magdeburger Markt" which were free of *Septoria apii* and other infectious diseases were sprayed in the concentration of 0.5% with a suspended in water preparation containing 20.0% tri-phenyl-monoaceto-stannane. The application took place four times at intervals of 6 weeks during the period of vegetation. As a means of comparison, an equally large number of plants were left untreated, and an equally large number of plants were sprayed with a copper preparation (50% pure Cu) and a mercury compound in the concentration of 0.5%.

The harvest yield, on the average, was as follows:

| Treating Agents | Concentration (Percent) | Average Weight of Each Celery Stalk (g.) | Average Weight of Leaves per Stalk (g.) |
|---|---|---|---|
| Triphenyl-aceto-stannane | 0.5 | 775 | 484 |
| Copper Oxychloride | 0.5 | 502 | 342 |
| Phenyl-Hg-Acetate | 0.5 | 475 | 334 |
| Untreated | | 432 | 316 |

EXAMPLE XIX

Sugar beets were treated in the concentration of 0.3% with a suspended in water preparation containing 20 parts of dibutyl-bis-(eithylenebisdithiocarbamato)-stannane.

As a means of comparison, an equal number of beets were sprayed in the concentration of 0.5% with a copper preparation (50% pure Cu) and the same number of beets were left untreated. The application took place at intervals of approximately 6 weeks during the period of vegetation.

The harvest yield was as follows:

| Treating Agent | Concentration, Percent | Percent Increased Yield in— | |
|---|---|---|---|
| | | Beets | Weight of Leaves |
| Dibutyl-bis-(ethylenebisdithiocarbamato)-stannane | 0.3 | 20.5 | 18.3 |
| Copper Oxychloride | 0.5 | 14.8 | 11.5 |
| Untreated | | ±0 | ±0 |

EXAMPLE XX

Tributyl-pentachlorphenolato-stannane has a noticeable effect on wheat seed germination. A composition containing 15 g. of that stannane was dusted on 100 kg. wheat seed kernels. The so-treated wheat kernels started to swell earlier than untreated ones as well as well as kernals disinfected in the usual way with a mercury disinfectant and the former's sprouts, on the average, are 30–40% longer than the latter's.

However, if the same stannane is sprayed in overconcentration, for example, in the form of a suspended concentrate containing 50% stannane at a quantity of 5 to 8 kg. per hectare upon germinating or young weeds 3 to 4 days before the germination of wheat, corn, beets, onions, etc., the sprouts of the weeds and the seeds just starting to swell are killed. However, this application does not effect subsequently germinating seeds.

We claim:

1. A process for controlling fungal and bacterial infestation of plants which comprises applying to the plant a fungitoxic and bacteriotoxic amount of an organic tetravalent tin compound of the formula:

wherein three members of $R_1$, $R_2$, $R_3$ and $R_4$ are each selected from the group consisting of lower alkyl, phenyl, benzyl and naphthyl and the fourth member is selected from the group consisting of lower alkyl, phenyl, benzyl, naphthyl, chloro, lower saturated aliphatic carbonyloxy, benzoyloxy, anthranyloxy, salicylyloxy, phenoxy, phenylmercapto and chlorophenoxy.

2. The process of claim 1 wherein at least two of $R_1$, $R_2$, $R_3$, and $R_4$ are butyl.

3. A process as defined in claim 1 wherein the tetravalent tin compound is triphenyltin chloride.

4. A method of combatting fungi which comprises contacting the fungi with a fungitoxic amount of a compound of the formula:

wherein three members of $R_1$, $R_2$, $R_3$ and $R_4$ are each selected from the group consisting of lower alkyl, phenyl, benzyl and naphthyl and the fourth member is selected from the group consisting of lower alkyl, phenyl, benzyl, naphthyl, chloro, lower saturated aliphatic carbonyloxy, benzoyloxy, anthranyloxy, salicylyloxy, phenoxy, phenylmercapto and chlorophenoxy.

5. A method of combatting bacteria which comprises contacting the bacteria with a bacteriotoxic amount of a compound of the formula:

wherein three members of $R_1$, $R_2$, $R_3$ and $R_4$ are each selected from the group consisting of lower alkyl, phenyl, benzyl and naphthyl and the fourth member is selected from the group consisting of lower alkyl, phenyl, benzyl, naphthyl, chloro, lower saturated aliphatic carbonyloxy, benzoyloxy, anthranyloxy, salicylyloxy, phenoxy, phenylmercapto and chlorophenoxy.

6. A method of combatting fungi which comprises contacting the fungi with a fungitoxic amount of a tetravalent tin compound selected from the group consisting of dialkyl-, trialkyl-, diaryl- and triaryltin salts of a monocarboxylic acid.

7. A method as defined in claim 6 wherein the tetravalent tin compound is a dialkyl-, trialkyl-, diaryl- or triaryltin acetate.

8. A method as defined in claim 6 wherein the tetravalent tin compound is triphenyltin acetate.

9. A method for controlling fungi which comprises treating matter susceptible to infestation by said organisms with a fungitoxic amount of a compound having the formula

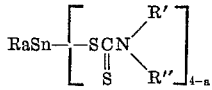

wherein R is selected from the group consisting of alkyl and aryl and wherein R' and R" constitute the anionic portion,

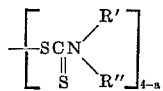

a member of the group consisting of the thiocarbamic acid radical and a derivative of the thiocarbamic acid radical, and wherein $a$ is an integer from 1 to 3.

10. A method for controlling fungi which comprises treating matter susceptible to infestation by said organisms with a fungitoxic amount of a compound having the formula

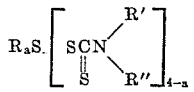

wherein R is selected from the group consisting of alkyl and aryl, R' is selected from the group consisting of hydrogen and alkyl, R" is alkyl and $a$ is an integer from 1 to 3.

11. A method for controlling fungi which comprises treating matter susceptible to infestation by said organisms with a fungitoxic amount of a compound having the formula

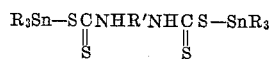

wherein R is selected from the group consisting of alkyl and aryl and R' is alkylene.

12. A method for destroying fungi which comprises treating matter infested by said fungi with a fungitoxic amount of a compound having the formula

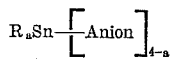

wherein R is a member selected from the group consisting of alkyl and aryl, wherein anion is a member selected from the group consisting of the dithiocarbamic acid radical and N hydrocarbon derivatives of said radical, and wherein $a$ is an integer from 1 to 3.

13. A method for destroying fungi which comprises treating matter infested by said fungi with a fungitoxic amount of a compound having the formula

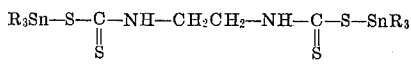

wherein R is selected from the group consisting of alkyl and aryl.

14. A process for disinfecting a solution containing spores which comprises suspending in the solution at least 0.005% by weight of an organic tetravalent tin compound of the formula

wherein three members of $R_1$, $R_2$, $R_3$ and $R_4$ are each selected from the group consisting of lower alkyl, phenyl, benzyl and naphthyl and the fourth member is selected from the group consisting of lower alkyl, phenyl, benzyl, naphthyl, chloro, lower saturated aliphatic carbonyloxy, benzoyloxy, anthranyloxy, salicylyloxy, phenoxy, phenylmercapto and chlorphenoxy.

15. The process of claim 14 wherein at least two of $R_1$, $R_2$, $R_3$, and $R_4$ are butyl.

16. A disinfectant composition comprising an emulsifying agent and a fungicidally and bactericidally effective amount of tetrabutyl tin.

17. A disinfectant composition comprising an emulsifying agent and a fungicidally and bactericidally effective amount of triphenyltin acetate.

18. A disinfectant composition comprising an emulsifying agent and a fungicidally and bactericidally effective amount of triphenyltin chloride.

References Cited

UNITED STATES PATENTS

| | | | |
|---|---|---|---|
| 1,744,633 | 1/1930 | Hartmann et al. | 117—138.5 |
| 2,278,965 | 4/1942 | Peski et al. | 260—429.7 |
| 2,580,473 | 1/1952 | Sowa et al. | 167—22 XR |
| 2,507,030 | 5/1950 | Lynch | 260—429.7 |

FOREIGN PATENTS 68,578   9/1951   Netherlands.

OTHER REFERENCES

Guthrie et al.: North American Veterinarian, vol. 22, January 1941, pp. 22–24, 167/53.1.

Van der Kerk, J. Appl. Chem., vol. 4, June 4, 1954, pp. 314–319.

ALBERT T. MEYERS, Primary Examiner

V. D. TURNER, Assistant Examiner

U.S. Cl. X.R.

71—97; 424—288